April 6, 1948.  H. N. RUEBEL  2,439,024
RENEWABLE VALVE SEAT
Filed Dec. 26, 1944  2 Sheets-Sheet 1
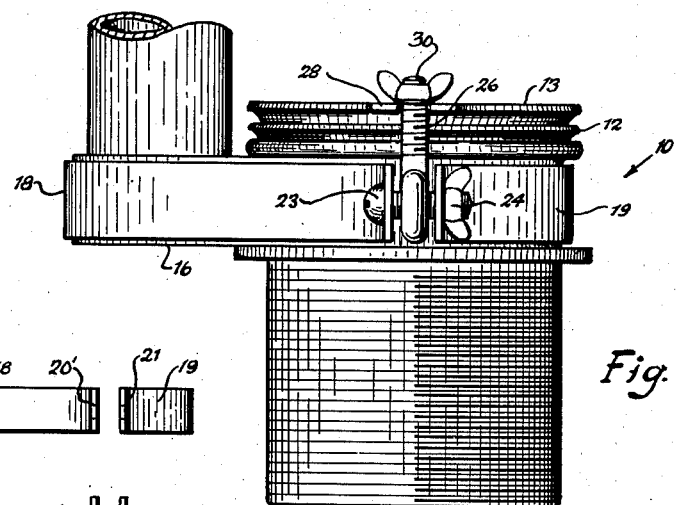
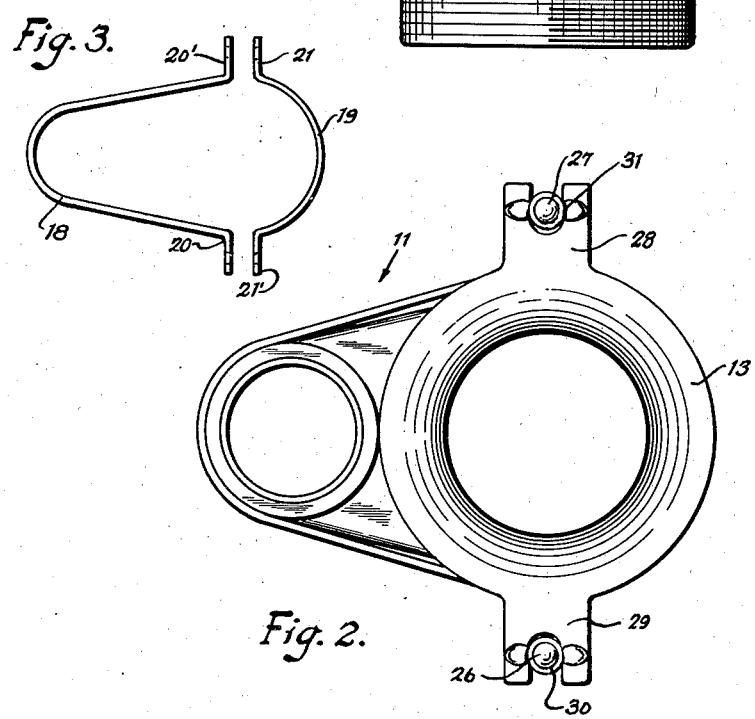
Inventor
Harry N. Ruebel.

April 6, 1948. H. N. RUEBEL 2,439,024
RENEWABLE VALVE SEAT
Filed Dec. 26, 1944 2 Sheets-Sheet 2

Inventor
Harry N. Ruebel.

By Clarence A. O'Brien
and Harvey B. Jacobson
Attorneys

Patented Apr. 6, 1948

2,439,024

UNITED STATES PATENT OFFICE 2,439,024

RENEWABLE VALVE SEAT

Harry N. Ruebel, Berlin, Md.

Application December 26, 1944, Serial No. 569,839

2 Claims. (Cl. 251—167)

This invention relates to flush tanks and has for its object to provide a renewable seat for the flush valve thereof.

Another object of the invention is to provide a repair seat which may be very quickly and accurately mounted upon a worn out or leaky seat.

A further object of the invention is to provide a replacement valve seat so constructed that it may be very quickly attached to a worn and leaky seat, without the necessity of removing the valve assembly from the tank, thus saving much time, labor and expense in the usual method of making such repairs.

Other features and advantages will become more readily apparent from the following description and the accompanying illustrative drawings in which:

Figure 1 is a side elevational view of a flush valve assembly embracing my invention, Figure 2 is a top plan view thereof, Figure 3 is a detail view of a securing member shown in plan.

Figure 6 is an elevational view of the clamp forming part of the invention.

Figure 4:
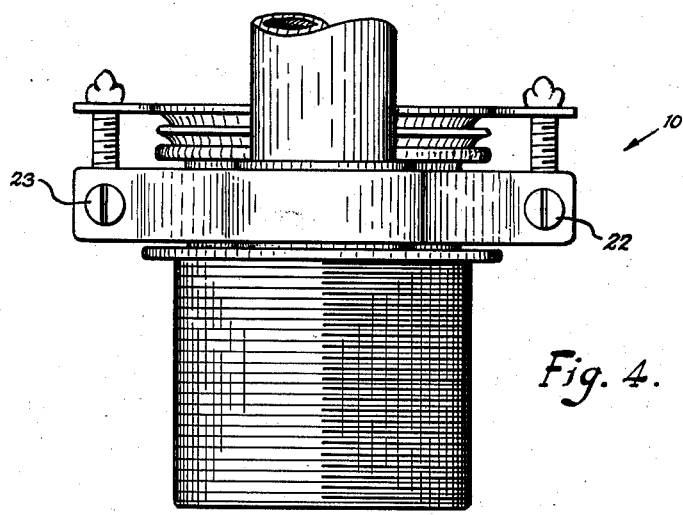
Figure 4 is an elevational view similar to Figure 1, shown from a different angle.
Figure 5:
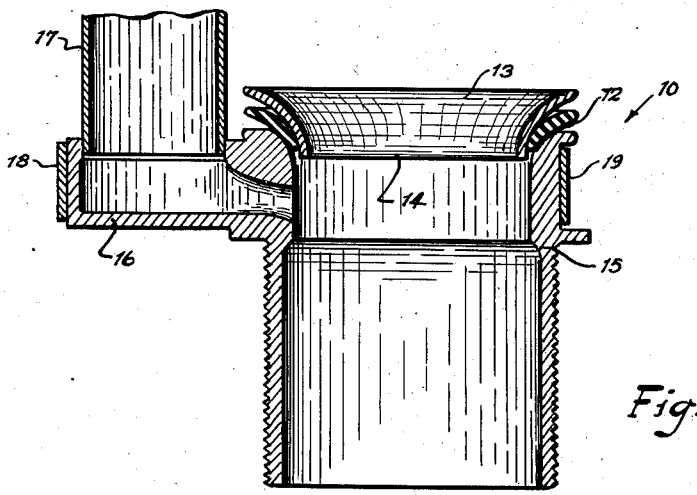
Figure 5 is a section on line 5—5 thereof.

In the accompanying drawings as above enumerated and in the following specification, like characters of reference indicate like parts throughout and in which 10, designates my valve seat assembly which consists of a two-piece securing band 11, a tapering feathered-edge washer 12, and an attachable valve seat 13, the latter being also tapered, its small and lower end 14, being of a diameter substantially that of, or slightly less, than the diameter of the original valve seat member 15, which includes the connection 16, to which the overflow pipe 17 is attached.

When the old valve seat 15, becomes pitted from corrosion or otherwise worn and leaky, the new seat 13, may quickly be substituted therefor by a novice and without tools in the following manner:

The band 11, which is formed of two members, a yoke 18, and a bow 19, both provided with opposing wings 20 and 21, is placed around the members 15 and 16, and secured thereto by screws 22 and 23, projecting through opposing bores in the wings 20 and 21, and secured by wing nuts 24 and 25. Mounted on the screws 22 and 23, are eye bolts 26 and 27, which (after the members 12 and 13, have been placed upon the old seat 15) are adapted to be swung up into the bifurcated oppositely disposed arms 28 and 29, of the seat 13, and be secured thereto by wing nuts 30 and 31, whereby the members 12 and 13, are clamped tightly upon the seat 15, whereby a new substitute is provided for receiving a preferably new flush valve. It is, of course, understood that the member 11, is securely clamped to the members 16 and 15, by means of the nuts 24.

From the foregoing it will be obvious that my new seat assembly may be attached without the use of any tools, the wing nuts 24, 30 and 31, in conjunction with the several above described elements, do the securing trick.

It is thought that persons skilled in the art to which the invention relates will be able to obtain a clear understanding of the invention after considering the description in connection with the drawings. Therefore, a more lengthy description is regarded as unnecessary.

Minor changes in shape, size and rearrangement of details and parts such as come within the purview of the invention claimed may be resorted to, in actual practice, if desired.

Having now described my invention that which I claim as new and desire to procure by Letters Patent is:

1. In a renewable valve seat assembly a two-piece clamp member, a tapered washer, a ball valve seat and means for clamping said members to an old valve fixture, screws and wing nuts thereon whereby said clamp members are connected, said members having opposing wings to receive said screws and eye bolts pivoted on the screws for engagement with said valve seat, and said last member having bifurcated arms to receive said eye bolts.

2. In a renewable valve seat assembly, a multi-piece clamp member, a tapered washer, a ball valve seat, means for clamping said member and said washer and said seat to an existing fixture, said means including wings extending from said valve seat, bolts extending through terminal portions of said multi-piece clamp, eye bolts pivotally received on said bolts and means for retaining said eye bolts fixed relative to said wings.

HARRY N. RUEBEL.

REFERENCES CITED

The following references are of record in the file of this patent:

UNITED STATES PATENTS

| Number | Name | Date |
|---|---|---|
| 1,222,081 | Demilt | Apr. 10, 1917 |
| 1,570,681 | Kirkham | Jan. 26, 1926 |
| 1,867,262 | Howle | July 12, 1932 |
| 1,919,501 | Colvin | July 25, 1933 |
| 2,001,830 | Weir | May 21, 1935 |
| 2,190,147 | Ciaccio | Feb. 13, 1940 |
| 2,277,388 | Clark | Mar. 24, 1942 |

FOREIGN PATENTS

| Number | Country | Date |
|---|---|---|
| 223,335 | Great Britain | Oct. 23, 1924 |